(12) United States Patent
Cornett et al.

(10) Patent No.: US 6,940,016 B1
(45) Date of Patent: Sep. 6, 2005

(54) ELECTRICAL ROUGH-IN BOX FOR LOW VOLTAGE TRANSFORMER

(75) Inventors: Roger Dennis Cornett, Bowling Green, KY (US); Scott Blaise Tylicki, Bowling Green, KY (US); Douglas Dean Rohrer, Bowling Green, KY (US)

(73) Assignee: Desa IP, LLC, Bowling Green, KY (US)

( * ) Notice: Subject to any disclaimer, the term of this patent is extended or adjusted under 35 U.S.C. 154(b) by 0 days.

(21) Appl. No.: 10/635,126

(22) Filed: Aug. 6, 2003

(51) Int. Cl.$^7$ ................................ H01H 9/02
(52) U.S. Cl. ................ 174/58; 174/50; 174/60; 439/535
(58) Field of Search ............... 174/58, 60, 50, 174/135; 220/3.2, 3.3, 402; 248/906; 439/535

(56) References Cited

U.S. PATENT DOCUMENTS

| | | |
|---|---|---|
| 1,286,811 A | 12/1918 | Sheransky |
| 1,929,844 A | 10/1933 | Haas |
| 2,028,509 A | 1/1936 | Knell |
| 2,887,525 A | 5/1959 | Lewus |
| 3,232,566 A * | 2/1966 | Eisenberg ............... 248/27.3 |
| 3,360,752 A | 12/1967 | Uptegraff, Jr. |
| 3,365,535 A | 1/1968 | Wilk |
| 3,472,945 A | 10/1969 | Trachtenberg |
| 3,579,044 A | 5/1971 | Phillips, Jr. |
| 3,636,236 A | 1/1972 | Smith |
| 4,059,327 A | 11/1977 | Vann |
| 4,202,457 A | 5/1980 | Tansi |
| 4,685,581 A | 8/1987 | Kaneda et al. |
| 4,810,897 A | 3/1989 | Shotey |
| 5,177,325 A | 1/1993 | Giammanco |
| 5,257,946 A | 11/1993 | MacMillan et al. |
| 5,289,934 A | 3/1994 | Smith et al. |
| 5,350,884 A | 9/1994 | Littrell |
| 5,445,539 A | 8/1995 | Dale |
| 5,486,650 A | 1/1996 | Yetter |
| 5,510,948 A | 4/1996 | Tremaine et al. |
| 5,574,256 A | 11/1996 | Cottone |
| 5,594,207 A | 1/1997 | Fabian et al. |
| 5,659,151 A | 8/1997 | Dale |
| 5,735,710 A | 4/1998 | Blaauboer et al. |
| 6,080,013 A | 6/2000 | Beland et al. |
| 6,218,613 B1 | 4/2001 | Justiniano et al. |
| 6,239,365 B1 | 5/2001 | McEvers |
| 6,300,567 B1 | 10/2001 | Hayduke et al. |
| 6,395,979 B1 * | 5/2002 | English ............... 174/50 |
| 6,395,981 B1 | 5/2002 | Ford et al. |
| 6,520,363 B1 * | 2/2003 | Sullivan ............... 220/3.8 |
| 6,683,249 B1 * | 1/2004 | Leppin ............... 174/50 |
| 2001/0022301 A1 | 9/2001 | O'Donnell |

* cited by examiner

*Primary Examiner*—Dhiru R. Patel
(74) *Attorney, Agent, or Firm*—Middleton & Reutlinger (57) ABSTRACT

An electrical rough-in box for a low voltage transformer is provided. The box has a removable cover with a low voltage transformer mounted there through. The removable cover contains a recessed portion for accommodating low voltage wiring. A sidewall of the box contains a channel for low voltage wiring, thus permitting flush mounting of the box against a wall stud.

6 Claims, 10 Drawing Sheets

ELECTRICAL ROUGH-IN BOX FOR LOW VOLTAGE TRANSFORMER

FIELD OF THE INVENTION

The present invention relates generally to an electrical rough-in box for a low voltage transformer. The rough-in box provides an electrician with improved access to the transformer, terminals, connectors and wiring inside of the box thus reducing the time and cost for the installation of, for example, a door bell system. The rough-in box also permits a push button switch, transformer and chime mechanism associated with a door bell system to be located in closer proximity to one another thus reducing the cost for installation of such a system.

BACKGROUND OF THE INVENTION

Electrical power is usually provided to residential homes at a line voltage of 120 volts AC by a public electrical utility. Inside of the home, certain applications (such as halogen lighting fixtures) require a reduction from the standard household current of 120 volts to the appropriate lighting requirements, generally 12 or 24 volts. This reduction, or step-down, in voltage is typically accomplished by means of a low voltage electrical transformer. Another type of household electrical application that requires the use of a transformer is a door bell system. A door bell system comprising one or more push button switches, electrical wiring and a chime mechanism require a transformer to step down the standard 120 volt household current to a lower voltage which is appropriate for the chime mechanism, often 16 volts. Currently, in many building applications such as a residence, electricians must search for appropriate locations to mount such low voltage transformers before they begin to pull electrical wire to complete, in the case of a door bell system, the electrical circuit between the push button switch, the transformer and the chime mechanism. The National Electric Code ("NEC") and local codes do not permit transformers to be mounted in attics or non-accessible locations such as inside of finished walls. As such, in many cases transformers are mounted by electricians in a closet or other location close to the chime mechanism where the transformer can be hidden. This is often an inconvenience to the homeowner. Alternatively, electricians mount the transformer directly to the main electrical breaker box. This location, however, can require significantly more electrical wire and electrician time to complete the push button switch, transformer, chime mechanism electrical circuit and hence be more costly.

Ideally, the push button switch, the chime mechanism, and the low voltage transformer are all located in close proximity to each other. In practice, it rarely works this way. Because the transformer is usually mounted outside of the walls, it is located in an out-of-the-way place so as not to be an eyesore. Conversely, the chime mechanism must be mounted in an open place in the residence so that it is likely to be heard by an occupant when the push button is depressed. If mounted inside of a closet close to the transformer, for example, the sounds created by the chime mechanism might not be heard. As a result, wiring needs to be run from the push button, which is necessarily mounted near an entrance door, to the transformer, which is necessarily mounted in an out-of-the-way place, to the chime mechanism, which is necessarily mounted in a central area of the house where it can be heard. The wiring is run inside of the walls beneath sheet rock. The transformer and chime mechanism are mounted outside of the walls. If there is a substantial delay between the time the wiring is originally run and the time the chime mechanism and transformer are mounted, it can be difficult for an electrician to find the previously run wires that may have been covered by sheet rock. All of this makes the installation of a door bell system more complicated, time-consuming and expensive than is necessary.

SUMMARY OF THE INVENTION

The present invention is an electrical rough-in box for a low voltage transformer which is designed not only to overcome these problems but also to provide an electrician with improved access to the transformer, terminals, connectors and wiring inside of the rough-in box thus reducing the amount of an electrician's time, and hence the cost, for many low voltage applications.

The area inside of the rough-in box is designated the line voltage wiring section. Line voltage is standard household current of 120 volts AC. Line voltage wires can enter the interior of the box through holes drilled by the electrician in the walls of the box or, more preferably, through standard knock-outs in one or more wall of the box. The box has a removable cover secured to the body of the box by screws, bolts, clamps or other securing means. Through the removable cover is mounted a typical low voltage transformer such as a 16 volt AC used for hardwired doorbell systems. The low voltage transformer has two ends: a line voltage end and an opposed low voltage end. The outside wall of the cover of the box has a recessed section that the low voltage end of the transformer protrudes through. This recessed section is also the low voltage wiring section. That is, wires connected to and leading from the low voltage end of the low voltage transformer reside in the low voltage wiring section. These low voltage wires may be connected directly to, for example, a low voltage appliance such as a chime mechanism or, via channel in a sidewall of the body of the box and an entryway to the channel in a flange of the removable cover, to an electrical switch such as a door bell push button.

The electrical rough-in box of the present invention would typically be installed during the rough-in stage of the electrical work in, for example, a residence. The line voltage wires carrying a power supply to the rough-in box would come off of a nearby branch circuit. The electrical rough-in box, with the low voltage transformer protruding through the recessed section of the removable cover and, preferably, mounted to the removable cover, would be mounted to a wall stud in the same manner as a normal electrical rough-in box. The line voltage and low voltage wire connections to the transformer could then easily be made by an electrician at either the rough-in stage or at the finish stage of the electrical work simply by removing the cover of the box on which the transformer is mounted and then accessing the appropriate terminals or connectors. Wall insulation can be brought up next to the box and during the drywall or wall finishing process an opening to the cover of the box would be cut through the wall as is normally done with electrical rough-in boxes. A chime mechanism would preferably be mounted on the finished wall over the electrical rough-in box. This arrangement would minimize the amount of low voltage wiring which would need to be run between the rough-in box and the chime, thus reducing the cost for installation. Alternatively, the electrical rough-in box can be mounted on a floor joist or a roof rafter with the low voltage wiring run from that location to the chime mechanism and push button switch.

In another embodiment of the invention, the low voltage transformer protruding through the recessed portion of the removable cover is mounted to the bottom wall of the electrical rough-in box instead of to the removable cover.

In yet another embodiment of the invention, the low voltage transformer protruding through the recessed portion of the removable cover is mounted to a sidewall of the electrical rough-in box instead of to the removable cover.

In accordance with the foregoing objects, an electrical rough-in box for a low voltage transformer is disclosed providing improved access to the transformer, terminals, connectors and wiring. The electrical rough-in box of the present invention also permits a push button switch, transformer and chime mechanism associated with a door bell system to be located in close proximity to one another, thus reducing the cost for installation of such a system.

The novel aspects of the invention are set forth with particularity in the appended claims. The invention itself, together with further objects, features, aspects and advantages will be readily apparent to those skilled in the art and a better understanding of the present invention may be had by reference to the following detailed description taken in connection with the following drawings.

DETAILED DESCRIPTION OF THE PREFERRED EMBODIMENTS

Figure 1:
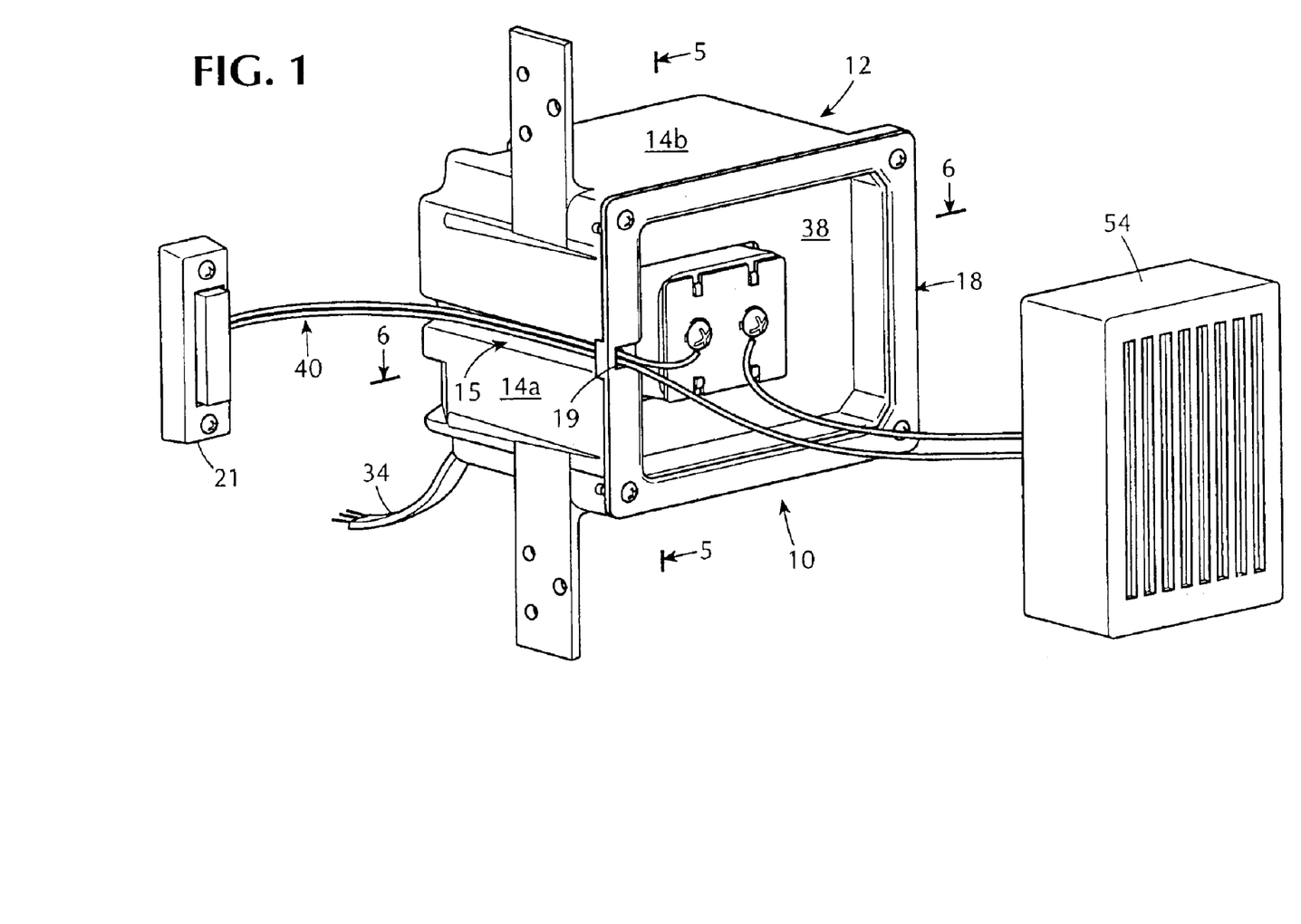
FIG. 1 is a front perspective view of the electrical rough-in box depicting the low voltage wires from the low voltage end of the low voltage transformer connected to a door bell system chime mechanism and further to a push button switch via a channel in a sidewall of the box.
Figure 2:
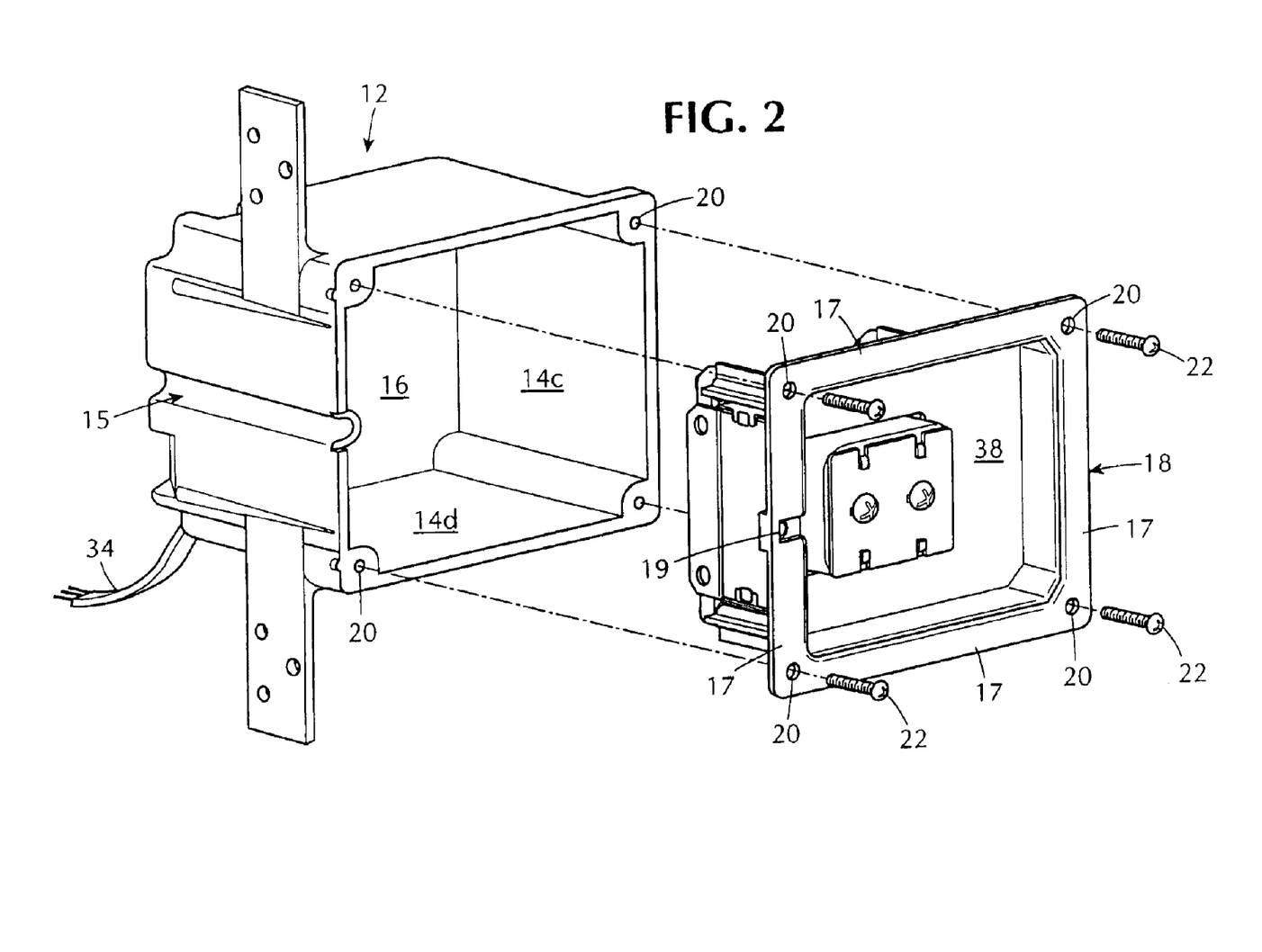
FIG. 2 is a partially exploded front perspective view of the preferred embodiment of the electrical rough-in box.

Referring now to the drawings there is shown in FIG. 1 an electrical rough-in box for a low voltage transformer. The box 10 preferably includes a generally square-shaped cover 18 and generally square-shaped body 12 having four sidewalls 14a, 14b, 14c, 14d and a bottom wall 16 (FIG. 2). The bottom wall 16 is in contact with and connected to each of the sidewalls. It will be understood by those of ordinary skill in the art that the shape of the body 12 and cover 18 need not be generally square but may, alternatively, be generally rectangular, triangular, circular or of other geometric shape.

Figure 6:
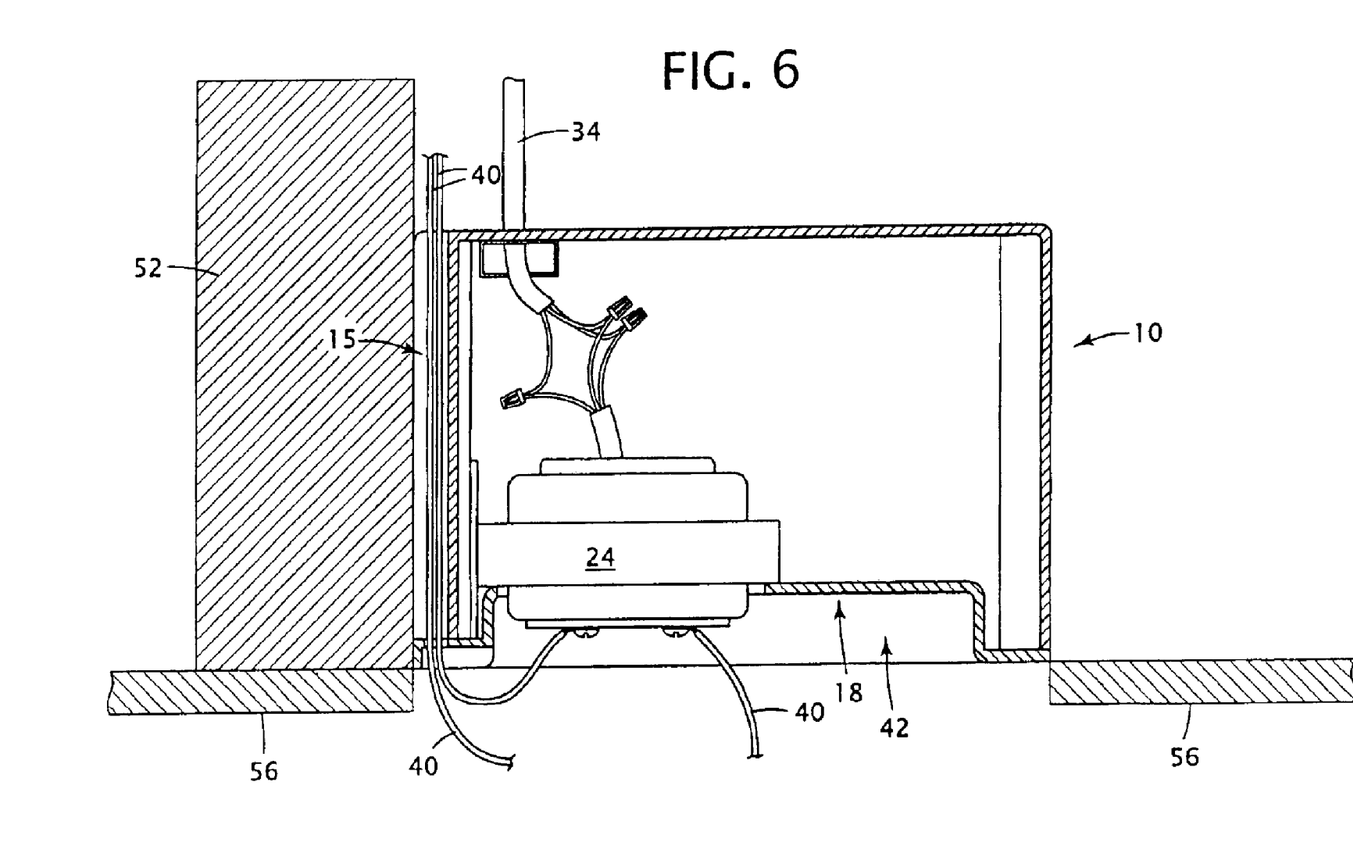
FIG. 6 is a top plan view of the electrical rough-in box along line 6—6 of FIG. 1, mounted to a wall stud.

The box 10 may be constructed of metal or plastic. Preferably, the box 10 is formed from moldable plastic, such as polycarbonate or the like, which makes the box easy to manufacture using standard injection molding techniques. Sidewalls 14a, 14b, 14c, 14d and bottom wall 16 are preferably molded together to form a one piece body 12. One or more of sidewalls 14a, 14b, 14c, 14d preferably have a channel or wireway 15 recessed therein on their outside wall for receiving a low voltage wire 40 (FIG. 1). Cover 18 is separately molded and is removably attached to body 12 by screw 22, bolts, clasps or other attaching means disposed through holes 20 in the flanges 17 of the cover 18 (FIG. 2). The outside wall of cover 18 is molded to form a recessed portion 38 therein defining a low voltage wiring section 42 (FIG. 6). The recessed portion 38 is surrounded by flanges 17 which have a raised relief in relation to the recessed portion 38. One or more of flanges 17 contain an entryway or wire passageway 19 which is aligned with one or more of channels 15 when the cover 18 is attached to the body 12 (FIG. 2).

Figure 4:
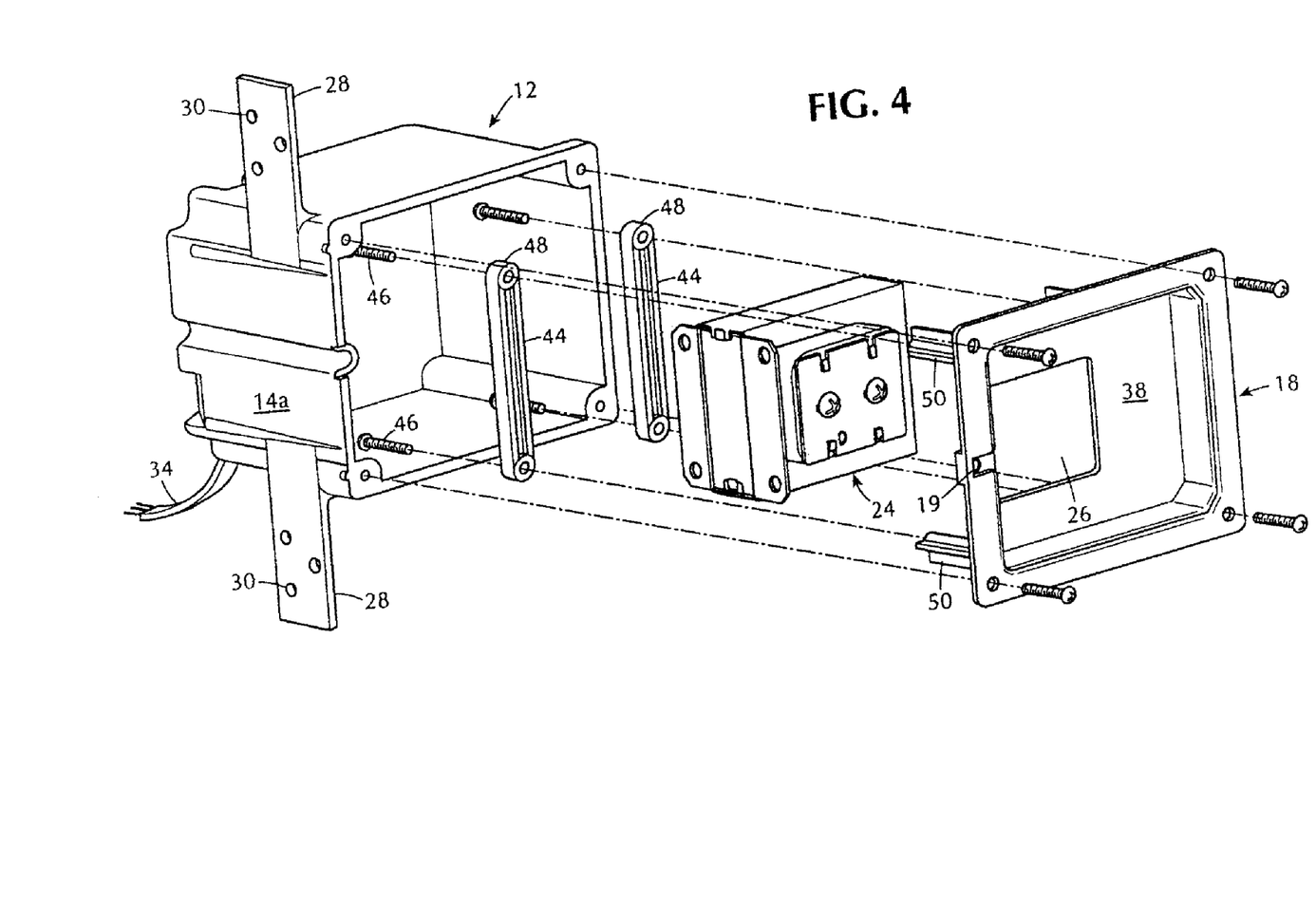
FIG. 4 is an exploded front perspective view of the preferred embodiment of the electrical rough-in box with the low voltage transformer mounted to the removable cover.

Referring to FIG. 4, a low voltage transformer 24 having a line voltage end or primary side and a low voltage end or secondary side is disposed through an opening 26 in the recessed portion 38 of the cover 18. The transformer 24 is preferably mounted to cover 18 through opening 26 in cover 18 by means of brackets 44 and screws 46 disposed through holes 48 in the brackets; the screws 46 being in a securing relationship with posts 50 which are integrally molded with and attached to cover 18. One or more mounting tabs 28 are integrally molded with and attached to one or more of the side walls 14 of body 12 which allows the electrical rough-in box 10 to be fastened to a stud 52 in a wall or other fixed structure. The mounting tabs 28 will preferably have notches or holes therein 30 to accommodate a stud fastening means such as nails, bolts or screws (not shown).

Figure 7:
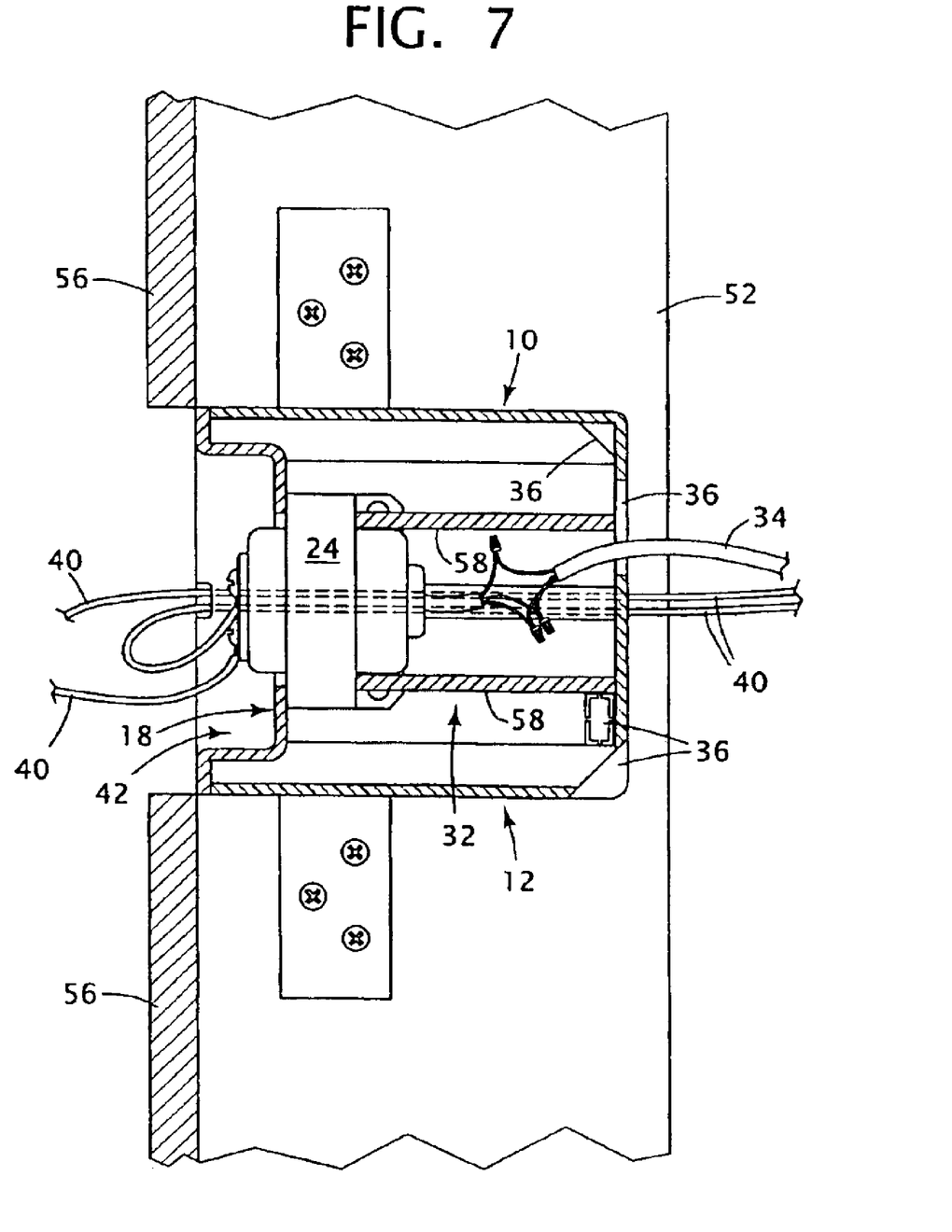
FIG. 7 is a cross-sectional view of the electrical rough-in box, along line 5—5 of FIG. 1, depicting the low voltage transformer mounted to the bottom wall of the rough-in box.
Figure 8:
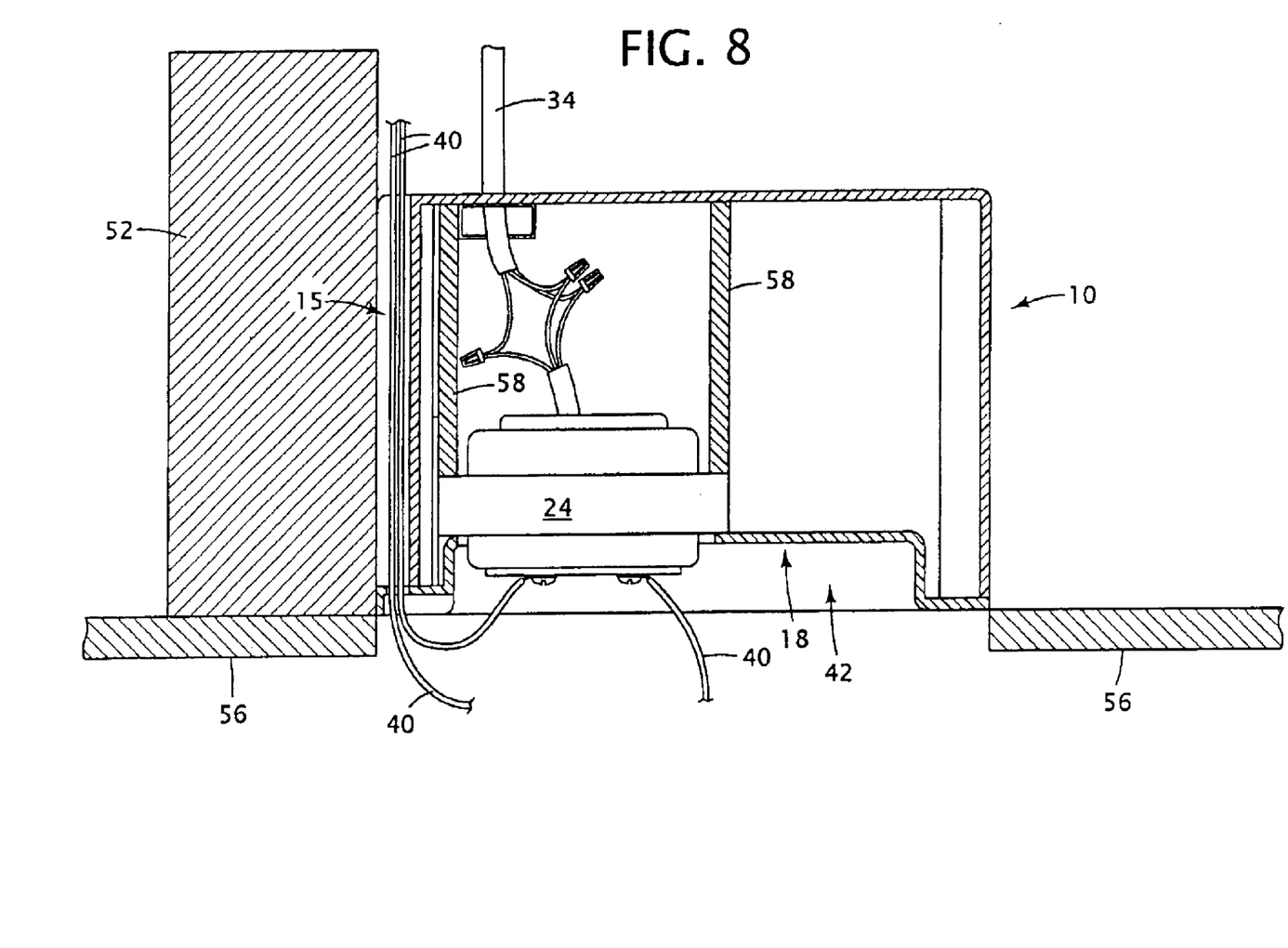
FIG. 8 is a top plan view of the electrical rough-in box, along line 6—6 of FIG. 1, depicting the low voltage transformer mounted to the bottom wall of the rough-in box.

In another embodiment of the invention (see FIGS. 7 and 8), the low voltage transformer 24 instead of being mounted to cover 18 is mounted to bottom wall 16 of body 12 by securing means such as screws, bolts, clasps, brackets 58, straps or other molded features. In this embodiment the low voltage end of transformer 24 is still disposed through opening 26 in the recessed portion 38 of cover 18.

Figure 9:
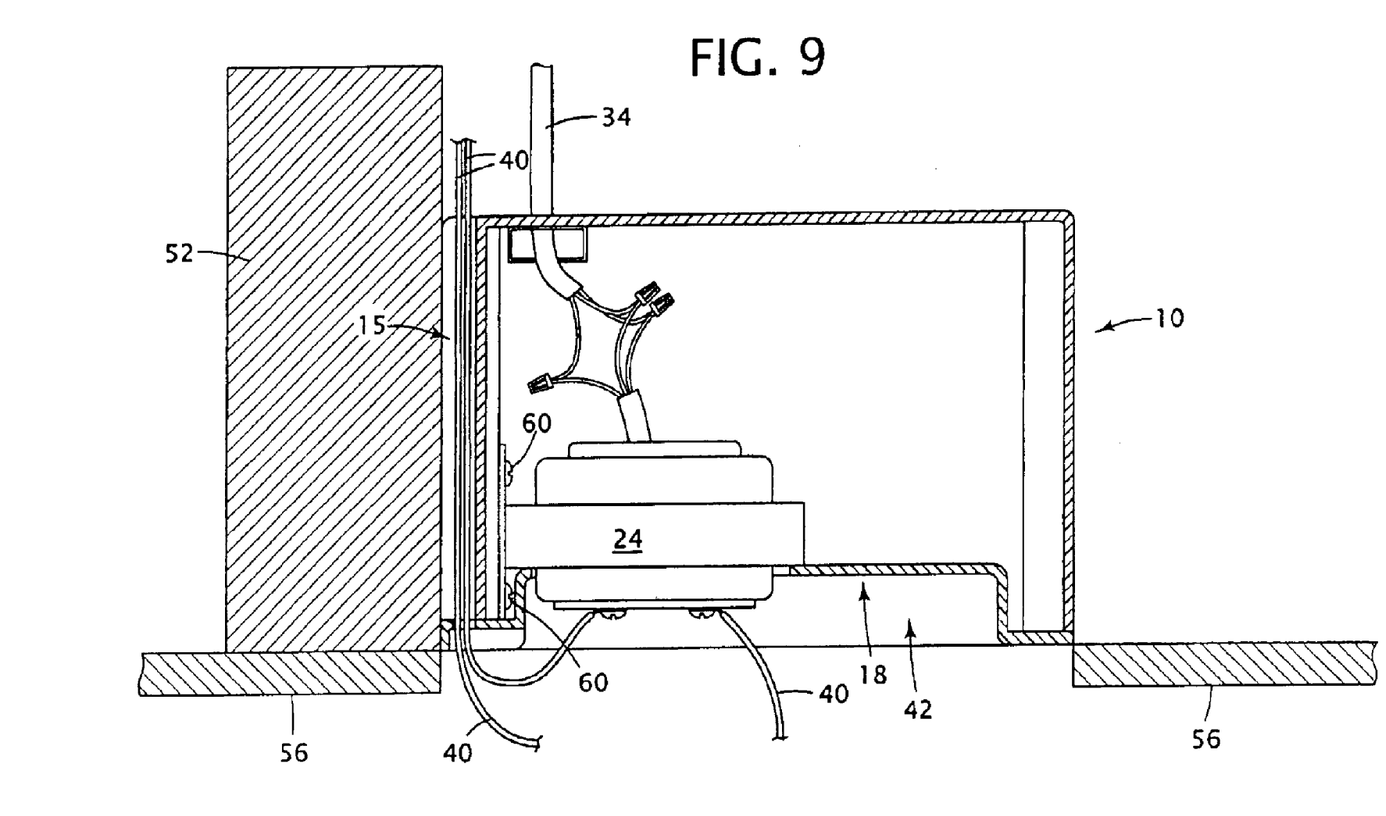
FIG. 9 is a cross-sectional view of the electrical rough-in box, along line 5—5 of FIG. 1, depicting the low voltage transformer mounted to a sidewall of the rough-in box.

In yet another embodiment of the invention (see FIG. 9), the low voltage transformer 24 instead of being mounted to cover 18 is mounted to a sidewall 14 of body 12 by securing means such as screws 60, bolts, clasps, brackets, straps or other molded features. In this embodiment the low voltage end of transformer 24 is still disposed through opening 26 in the recessed portion 38 of cover 18.

Figure 5:
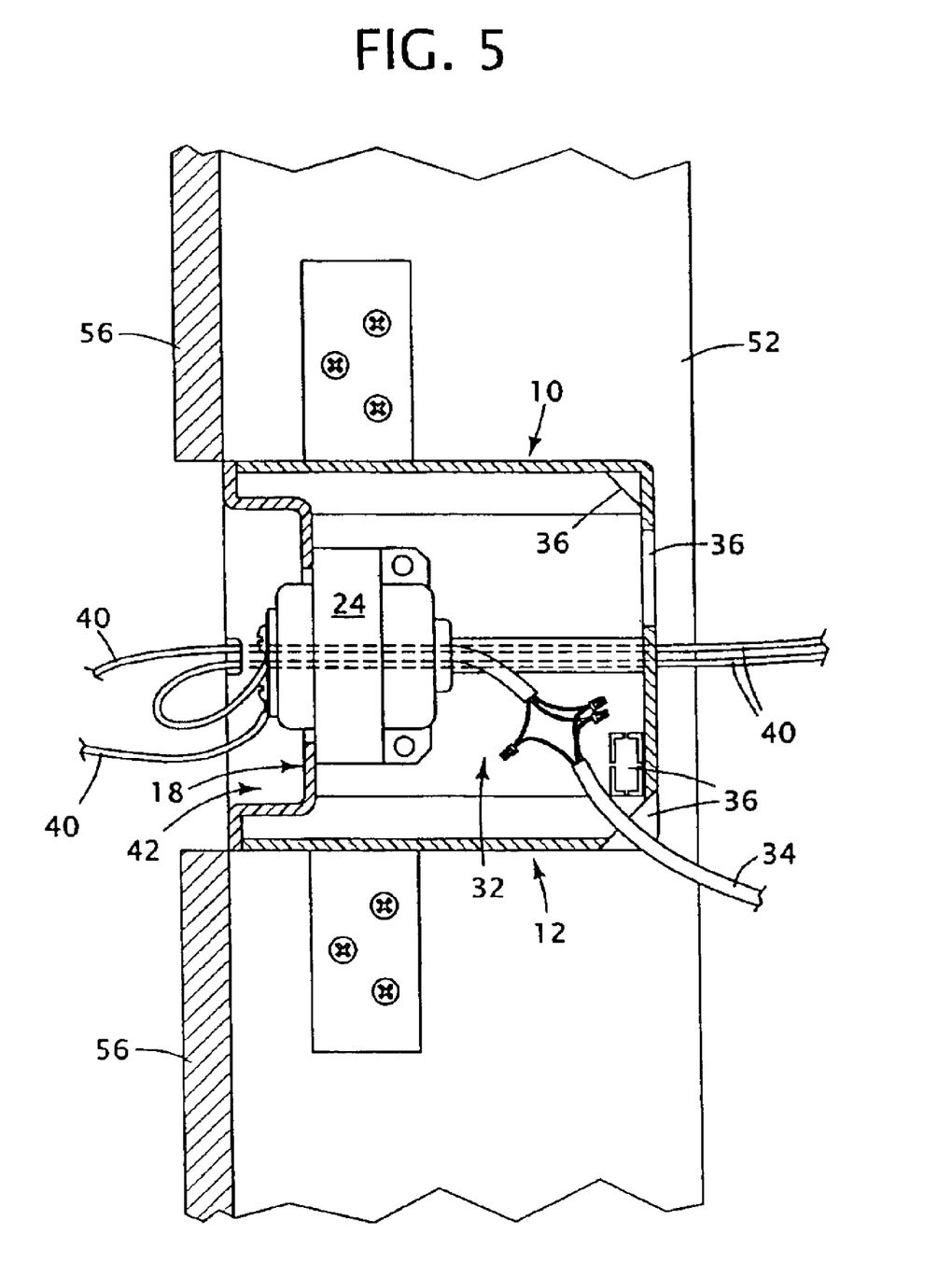
FIG. 5 is a cross-sectional view of the electrical rough-in box along line 5—5 of FIG. 1, mounted to a wall stud, and with the low voltage transformer mounted to the removable cover.

Referring to FIG. 5, the area inside of the box 10, defined by the body 12 and the cover 18 secured to the body 12, is designated the line voltage wiring section 32. The line voltage end of transformer 24 is contained within the line voltage wiring section 32. The low voltage end of transformer 24 protrudes through cover 18, by means of an opening 26 in the cover, and into the low voltage wiring section defined by the recessed portion 38 of cover 18. The removable cover thus serves to separate the low voltage wiring section 42 outside of box 10 from the line voltage wiring section 32 inside of box 10.

Figure 3:
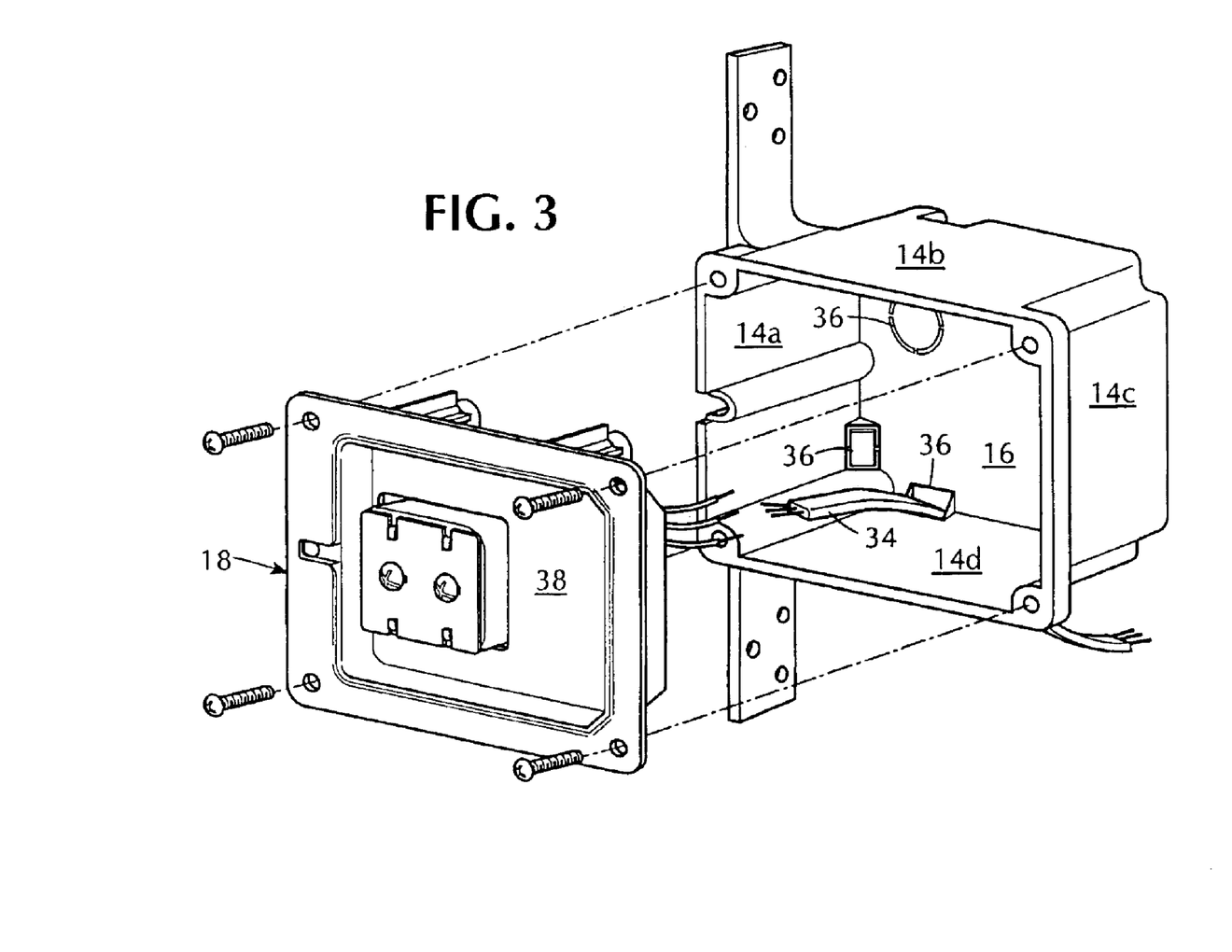
FIG. 3 is an additional partially exploded front perspective view of the preferred embodiment of the electrical rough-in box.

Line voltage wires 34 carrying standard household current of 120 volts enter the line voltage wiring section 32 through holes drilled by the electrician in any of sidewalls 14 or bottom wall 16 of body 12 or, more preferably, through any of knockout areas or entryway 36 which can be easily removed in order to form openings for the line voltage wires 34. The knockout areas or preformed apertures 36 are located in the sidewalls 14 and/or the bottom wall 16 of the body 12 (see FIG. 3). The line voltage wires 34 carrying a standard household current of 120 volts are connected to the line voltage end of transformer 24 within the line voltage wiring section 32 of box 10 (FIG. 5). The low voltage transformer steps-down or reduces the line voltage current to a lower voltage current suitable for transmission to, for example, household electrical lighting applications or a door bell system. Referring to FIG. 1, in the case of a doorbell system the reduced voltage current is carried by low voltage wires 40 in the low voltage wiring section 42 of cover 18 directly to a low voltage appliance (door bell chime 54), as well as to push button switch 21 by means of an entryway 19 in a flange 17 of cover 18 which leads into the recessed channels 15 in a sidewall 14 of box 10.

As can be observed in FIG. 6 which illustrates the box 10 secured to a wall stud 52 and drywall 56 installation having been completed, the advantage provided by channel 15 over prior art electrical rough-in boxes is that because the channel is recessed, it can accommodate the low voltage wires 40 therein, thus allowing the sidewall 14 of box 10 to be easily mounted flush against wall stud 52.

Figure 10:
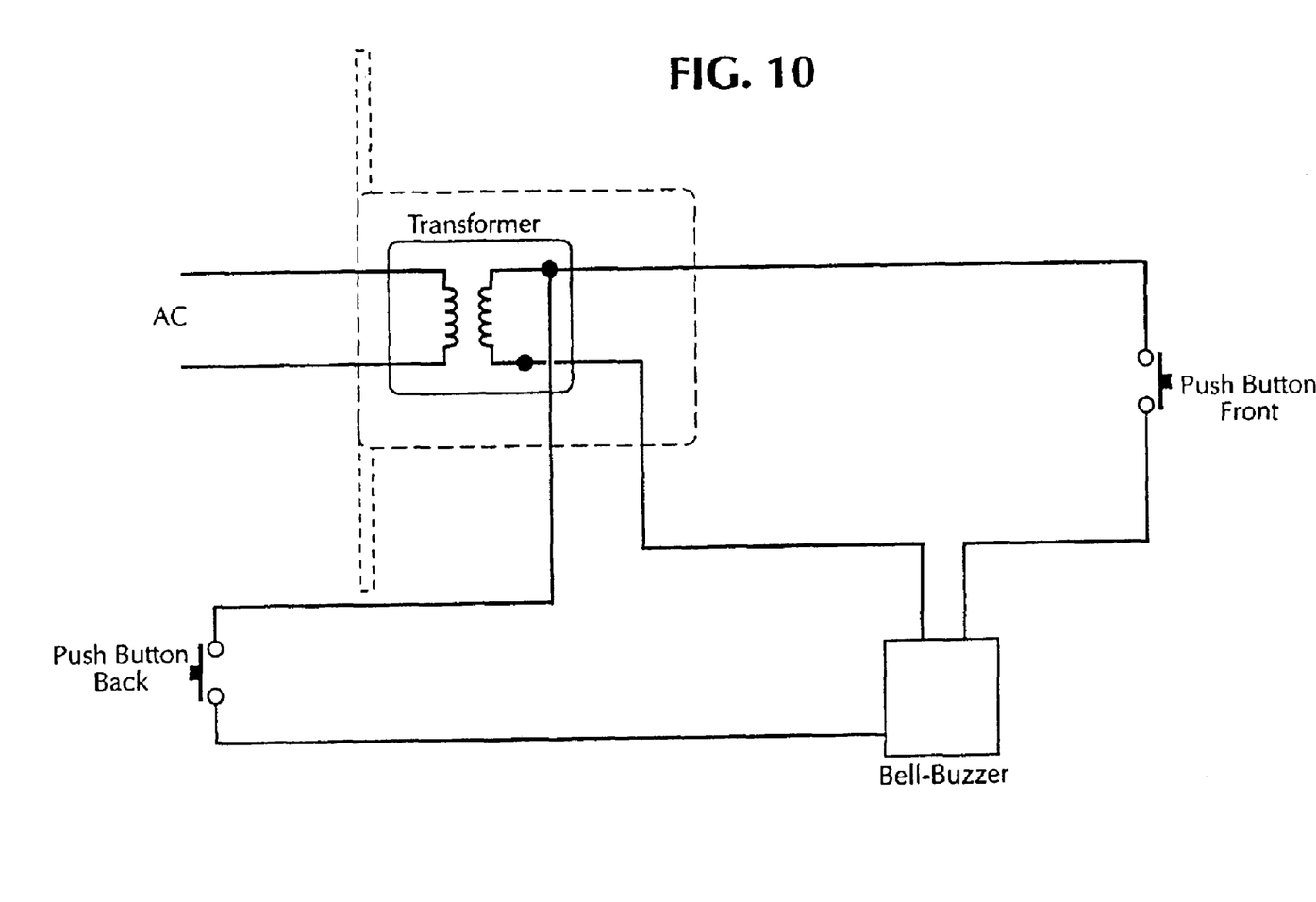
FIG. 10 is a typical schematic wiring diagram.

A distinct advantage of the electrical rough-in box 10 of the present invention over prior art electrical rough-in boxes is that because the cover 18 is easily removable from body 12, and the transformer 24 is easily removable from the cover 18, both by means of loosening screws 22 and 46, respectively, an electrician is afforded improved access not only to the transformer 24 but also to the terminals, connectors and wiring within box 10. This provides a significant advance over the prior art in terms of the convenience of use, construction and design for an electrician installing an electrical rough-in box for a low voltage transformer. FIG. 10 illustrates a typical wiring diagram as easily understood by those skilled in the art.

In this manner an electrical rough-in box for a low voltage transformer is provided which readily avoids the problems and shortcomings associated with prior art electrical rough-in boxes.

The preferred embodiment has been illustrated and described. Further modifications and improvements may be made thereto as may occur to those skilled in the art and all such changes as fall within the true spirit and scope of this invention are to be included within the scope of the claims to follow.

We claim:

1. An electrical rough-in box for a low voltage transformer, comprising:
   a rough in box comprising one or more sidewalls and a bottom wall, wherein said one or more sidewalls are connected to said bottom wall and have a channel recessed therein;
   a cover removably attached to said rough in box, forming a high voltage wiring section of about 120V AC in said rough in box, said cover comprising a recessed portion adjacent to one or more flanges forming a raised relief in relation to said recessed portion to form a low voltage wiring section of about 24 Volts or less AC or DC and said flanges contain an entryway aligned with said channel, wherein said one or more flanges are adapted to accept means for attaching said cover to said rough in box, said recessed portion having an opening there through;
   a low voltage transformer comprising a primary high voltage end and a secondary low voltage end, wherein said low voltage transformer is attached to said cover, and said secondary low voltage end of said low voltage transformer is disposed through said opening in said recessed portion of said cover into said low voltage wiring section;
   a first plurality of wires affixed to a high voltage source and extending from the exterior of said rough in box through an entryway in said rough in box into said high voltage wiring section and connecting to said primary high voltage end of said low voltage transformer; and
   a second plurality of wires connected to said secondary low voltage end of said low voltage transformer for attachment to a low voltage appliance at about 24 Volts or less AC or DC.

2. The electrical rough-in box of claim 1, wherein said low voltage transformer is removably attached to said cover.

3. The electrical rough-in box of claim 2, further comprising one or more brackets for removably attaching said low voltage transformer to said cover.

4. The electrical rough-in box of claim 1, further comprises a means for attaching said rough in box to a wall stud.

5. The electrical rough-in box of claim 1 wherein said rough in box is unitary.

6. An electrical rough-in box for a low voltage transformer, comprising:
   a square electrical rough in box having a removable cover, a bottom wall and a plurality of side walls, any of said walls having a formed wireway for allowing passage of at least one low voltage wire;
   said removable cover removably attached to said rough in box forming a high voltage wiring section interior of said rough in box, said removable cover affixed to said rough in box, said removable cover having an opening there through and having a flange on a periphery contacting said rough-in box, said flange having a wire passageway aligned with said formed wireway of said rough in box;
   a low voltage transformer having a primary high voltage end and a secondary low voltage end, wherein said low voltage transformer is disposed through said opening of said removable cover, said secondary low voltage end of said low voltage transformer being disposed through said opening in said cover and facing outward from said removable cover thereby forming a low voltage wiring area for electrical connection of a plurality of low voltage wires to said secondary low voltage end of said low voltage transformer;
   a plurality of high voltage wires affixed to a high voltage source and extending from the exterior of said rough in box through a entryway in said rough in box into said high voltage wiring section and connecting to said primary high voltage end of said low voltage transformer;
   said plurality of low voltage wires electrically connecting said secondary low voltage end of said low voltage transformer to a low voltage appliance.

* * * * *